US009729266B2

(12) United States Patent
Frantz et al.

(10) Patent No.: US 9,729,266 B2
(45) Date of Patent: Aug. 8, 2017

(54) NETWORK MANAGEMENT SYSTEM

(75) Inventors: Michael Frantz, Bad Aibling (DE); Paulo Santos, Amadora (PT)

(73) Assignee: Nokia Solutions and Netowrks Oy, Espoo (FI)

(*) Notice: Subject to any disclaimer, the term of this patent is extended or adjusted under 35 U.S.C. 154(b) by 412 days.

(21) Appl. No.: 14/390,078

(22) PCT Filed: Apr. 2, 2012

(86) PCT No.: PCT/EP2012/055925
§ 371 (c)(1),
(2), (4) Date: Oct. 2, 2014

(87) PCT Pub. No.: WO2013/149634
PCT Pub. Date: Oct. 10, 2013

(65) Prior Publication Data
US 2015/0063814 A1   Mar. 5, 2015

(51) Int. Cl.
*H04J 14/02* (2006.01)
*H04J 3/16* (2006.01)
(Continued)

(52) U.S. Cl.
CPC ........ *H04J 14/0227* (2013.01); *H04J 3/1652* (2013.01); *H04L 41/0896* (2013.01);
(Continued)

(58) Field of Classification Search
CPC .................. H04J 3/1652; H04J 14/0227; H04J 2203/0058; H04Q 11/0062; H04Q 2011/0079; H04L 41/0896; H04L 41/5077
(Continued)

(56) References Cited

U.S. PATENT DOCUMENTS

| 2004/0098474 A1 | 5/2004 | Galou et al. ................. 709/223 |
| 2004/0208552 A1* | 10/2004 | Harney .............. H04Q 11/0005 398/51 |

(Continued)

OTHER PUBLICATIONS

ITU-T G.709/Y.1331 (Feb. 2012); Interfaces for the optical transport network; Series G: Transmission Systems and Media, Digital Systems and Networks, Digital terminal equipments—General Series Y: Global Information Infrastructure, Internet Protocol Aspects and Next-Generation Networks, Internet protocol aspects—Transport, (238 pages).

*Primary Examiner* — Kan Yuen
*Assistant Examiner* — Richard Chang
(74) *Attorney, Agent, or Firm* — Harrington & Smith

(57) ABSTRACT

Services are transmittable via a transport network by using container(s), wherein each container is adapted to transmit data with a specific bandwidth and is multiplexable, according to a dynamic multiplexing structure, to at least another container adapted to transmit data with a higher bandwidth. The network management system selects a container being adapted to transmit data with a first bandwidth out of the number of containers, determines all containers of the number of containers being adapted to transmit data with a bandwidth lower than the first bandwidth, and defines all possible termination points for each determined container. All possible termination points are defined before a service to be transmitted is selected by a user. A number of the possible termination points for each determined container is selected based on a selection scheme in order to provide the selected number of the possible termination points to the user.

12 Claims, 3 Drawing Sheets

(51) Int. Cl.
*H04Q 11/00* (2006.01)
*H04L 12/24* (2006.01)

(52) U.S. Cl.
CPC ..... *H04L 41/5077* (2013.01); *H04Q 11/0062* (2013.01); *H04J 2203/0058* (2013.01); *H04Q 2011/0079* (2013.01)

(58) Field of Classification Search
USPC .......................................................... 398/79
See application file for complete search history.

(56) References Cited

U.S. PATENT DOCUMENTS

| | | | |
|---|---|---|---|
| 2011/0262128 A1* | 10/2011 | Madrahalli | H04J 3/12 398/2 |
| 2011/0274427 A1 | 11/2011 | Madrahalli et al. | 398/58 |
| 2012/0294610 A1* | 11/2012 | Genthner | H04J 3/1652 398/45 |
| 2013/0142509 A1* | 6/2013 | Connolly | H04J 3/1652 398/44 |

* cited by examiner

FIG 3A

NETWORK MANAGEMENT SYSTEM

FIELD OF INVENTION

The present invention relates to the field of network management systems, especially to a network management system for an optical transport network.

ART BACKGROUND

The field of technology is related to the management of optical networks, i.e. dense wavelength division multiplexing (DWDM) networks, especially to the management of the flexible multiplex structures and the electrical switching.

In new generation DWDM networks, several transport container (transmission layer) exist, i.e., optical channel data units ODUk with k=0 to 4, which can be multiplexed to each other without the need to follow fix containments and multiplex structures. That is, each ODUk (for instance k=1-4) can be multiplexed into each ODUk+n in any arbitrary order. The number of ODUk container as well as the possible containments (or client server relationships) increase constantly in the same way as the bandwidth increases which can be transmitted via an optical channel, e.g. 1 Gbit/sec→ODU0, 2.5 Gbit/sec→ODU1, 10 Gbit/sec→ODU2, 40 Gbit/sec→ODU3, 100 Gbit/sec→ODU4, . . . .

An ODUk can contain all ODUk−n (low order ODU, LO-ODU). The LO-ODU can be of the same layer only or mixed in each possible combination. However the overall bandwidth can be used only once, i.e. the load of one ODU3 is adequate to e.g. 4×ODU2 or 16×ODU1 or 32×ODU0. In addition, at least until now, ODU2/3e and ODUflex exist. For ODUflex, the bandwidth can be modified (increased/decreased) from 2.5 G/sec to 100 G/sec and multiplexed to each higher order ODUk (HO-ODUk) with k=2-4. That means that no fix multiplicity and relationship to the other ODUk layer can be defined. For instance, the containment in a ODU4 could be ODU1, ODU0, ODU0, ODU3, ODU3e, ODU2, ODU2e, ODUflex, . . . in each possible sequence of all possible ODUks.

In addition, the multiplexing cannot only be single stage but multistage, i.e. an ODU0 can be multiplexed into an ODU1, the ODU1 again into an ODU2, the ODU2 again into an ODU3 and the ODU3 again into an ODU4.

Due to the high flexibility to define the multiplex structure and the fact that the structure has not to be defined completely in one step but can be enhanced each time when a new service is to be configured in the network, it might be nearly impossible to offer the user any prepared templates for all possible multiplex structures which are possible—especially for ODU3 and above. The amount of selectable structures is very high, specially, if the possible combinations of the time slot usage in dependence on the payload type are considered. For instance, the possible combinations of ODU3 in an ODU4 can be seen from the following formula:

$$\binom{80}{32} = \frac{80!}{32!18!} = 2.19e^{22}$$

Even in case any system could handle this huge amount of combinations, it is very uncomfortable a user to handle it (like finding right template in a very long list).

In common networks, the multiplex structures were well defined and could be changed only according to fix rules and multiplicities. That means that the possible multiplex structures were limited and therefore easy to handle by the network management system and the user. As the flexibility is increasing, there may be a need for an improved system and method providing a flexible and dynamic management for a dynamic multiplexing structure.

SUMMARY OF THE INVENTION

This need may be met by the subject matter according to the independent claims. Advantageous embodiments of the present invention are described by the dependent claims.

According to a first aspect of the invention there is provided a network management system for a transport network, wherein services are transmittable via the transport network by using at least one of a plurality of containers, wherein each of the containers is adapted to transmit data with a specific bandwidth, wherein each of the plurality of containers is multiplexable, according to a dynamic multiplexing structure, to at least another container being adapted to transmit data with a higher bandwidth. The network management system comprises a selection unit being adapted to select a container being adapted to transmit data with a first bandwidth out of the plurality of containers, a determination unit being adapted to determine all (possible) containers of the plurality of containers being adapted to transmit data with a bandwidth lower than the first bandwidth, a definition unit being adapted to define all possible termination points (TP) for each determined container, wherein the definition unit is adapted to define all possible termination points before a service to be transmitted is selected by a user, and a sub-selection unit being adapted to select a number of the possible termination points for each determined container based on a selection scheme in order to provide the selected number of the possible termination points to the user.

The described network management system may be applicable to networks technologies like Ethernet, Virtual LAN (VLAN) or Multiprotocol Label Switching (MPLS).

"Container" in this context may denote any kind of function being provided by the network technology for transmitting data.

In the following, the network management system will be described in further detail with respect to an optical transport network using optical channel data units (ODUs) as container. However, it should be noted that all embodiments being described in the context of such an optical transport network may also be used in the context of other network technologies like Ethernet, VLAN or MPLS or any other network technology. The embodiments being described in the context of ODUs are thus not limited to the specific form of an optical transport network and ODUs but may be transferred to other network technologies.

According to an embodiment of the invention, the transport network is an optical transport network, and wherein the plurality of containers is a plurality of optical channel data units.

That means that services are transmittable via the optical transport network by using at least one of a plurality of optical channel data units, wherein each of the optical channel data units is adapted to transmit data with a specific bandwidth, wherein each of the plurality of optical channel data units is multiplexable, according to a dynamic multiplexing structure, to at least another optical channel data unit being adapted to transmit data with a higher bandwidth. This further means that the selection unit is adapted to select an optical channel data unit (ODUk) being adapted to transmit data with a first bandwidth out of the plurality of optical channel data units, that the determination unit is adapted to determine all (possible) optical channel data units (LO-ODU) of the plurality of optical channel data units being adapted to transmit data with a bandwidth lower than the first bandwidth, that the definition unit is adapted to define all possible termination points (TP) for each determined optical channel data unit (LO-ODU), wherein the definition unit is adapted to define all possible termination points before a service to be transmitted is selected by a user, and that the sub-selection unit is adapted to select a number of the possible termination points for each determined optical channel data unit (LO-ODU) based on a selection scheme in order to provide the selected number of the possible termination points to the user.

"Services" in this context may denote a group of data to be transmitted as requested by a user. The group of data may be coupled with specific requirements for bandwidth, protocol and so on.

"Optical channel data units" in this context may refer to ODU as defined for optical transport networks. ODU may denote a container or transmission layer. Different ODUs may be multiplexed according to flexible and dynamic multiplexing schemes. As explained above, optical channel data units ODUk with k=0 to 4 can be multiplexed to each other without the need to follow fix containments and multiplex structures. That is, each ODUk (for instance k=1-4) can be multiplexed into each ODUk+n in any arbitrary order. The number of ODUk container as well as the possible containments (or client server relationships) increase constantly in the same way as the bandwidth increases which can be transmitted via an optical channel, e.g. 1 Gbit/sec→ODU0, 2.5 Gbit/sec→ODU1, 10 Gbit/sec→ODU2, 40 Gbit/sec→ODU3, 100 Gbit/sec→ODU4, . . . .

An ODUk can contain all ODUk−n (low order ODU, LO-ODU) and additionally other structures like ODUflex. The LO-ODU can be of the same layer only or mixed in each possible combination. However the overall bandwidth can be used only once, i.e. the load of one ODU3 is adequate to e.g. 4×ODU2 or 16×ODU1 or 32×ODU0. In addition, at least until now ODU2/3e and ODUflex exist. For ODUflex, the bandwidth can be modified (increased/decreased) from 2.5 G/sec to 100 G/sec and multiplexed to each higher order ODUk (HO-ODUk) with k=2-4. That means that no fix multiplicity and relationship to the other ODUk layer can be defined. For instance, the containment in an ODU4 could be ODU1, ODU0, ODU0, ODU3, ODU3e ODU2, ODU2e, ODUflex, . . . in each possible sequence of all possible ODUks.

In addition, the multiplexing cannot only be single stage but multistage, i.e. an ODU0 can be multiplexed into an ODU1, the ODU1 again into an ODU2, the ODU2 again into an ODU3 and the ODU3 again into an ODU4.

"Termination points" in this context may denote a HO-ODU or a LO-ODU with a specific bandwidth which a user can select for specific services. HO-ODU may denote an ODU of higher order, i.e., a higher bandwidth, and LO-ODU may denote an ODU of a lower order than the HO-ODU, i.e., a lower bandwidth.

This aspect of the invention is based on the idea to provide an enhanced network management system, in which termination points may be dynamically exposed to a user. The possible or potential termination points are defined and presented to the user before a specific service is selected. The potential termination points are, before the service is selected, only virtual and are not physically installed in the network system.

Based on a selection scheme, which may be chosen by the user or may be predetermined by the network management system, a number of potential termination points is selected and can be presented to the user. The potential termination points are defined for all LO-ODU of one ODUk. During changes of the system or the multiplexing structure, the potential terminations points may be easily adapted as the network management unit may react dynamically to such changes.

According to an embodiment of the invention, the selection unit, the determination unit, the definition unit and the sub-selection unit are adapted to repeat their functionalities for each of the plurality of optical channel data units.

The potential termination points may be defined for each of the plurality of optical channel data units. Such, the result may be a list of potential termination points for each LO-ODU of each ODUk.

In the content of the above embodiment a single potential TP can represent all or multiple combinations of the total possible configurations that can be made in an ODUk to allocate a concrete LO-ODU as opposed to the current solution where each potential TP represents a concrete combination.

According to a further embodiment of the invention, the selection scheme corresponds to a selection of more than one, termination point, for instance a maximum of instantiable termination points, for each determined optical channel data unit or to a selection of one possible (also called single representative) termination point for each determined optical channel data unit.

According to this embodiment, more than one termination point, for instance the maximum instantiable termination points, independent of its characteristics like timeslot selection, for each LO-ODU (e.g. 4 ODU2 in a ODU3) for an ODUk or a single representative TP, again independent of its characteristics, for each LO-ODU for an ODUk may be selected. In the first case, multiple TPs are selected, which are possible in theory, also if they cannot be used all together (i.e. 32 ODU0 selected at the same time as 4 ODU2 in an ODU3). In the second case, only one TP per LO-ODU is selected. Thus, the choice for a user is more clearly represented.

According to a further embodiment of the invention, the definition unit is adapted to re-define, for the selected optical channel data unit (ODUk), the possible termination points (TP) for each determined optical channel data unit (LO-ODU), after a service and/or corresponding termination point is selected by the user.

If a user selects a service, an appropriate TP may be chosen by the network management system. The user can also select directly a TP or a combination of TP and service. In any case, the definition unit may re-define the possible TPs for an ODUk, based on the fact that one LO-ODU is selected and thus, the bandwidth for the specific selected ODUk may reduce the list of potential/possible TPs.

According to a further embodiment of the invention, if the selection scheme corresponds to a selection of one possible termination point for each determined optical channel data unit and one possible termination point is selected by the user, the definition unit is adapted to re-define, for the selected optical channel data unit (ODUk), all remaining possible termination points being available based on a determination of the remaining bandwidth.

The network management system may determine which TP (each corresponding to an LO-ODU) are still available. This may mean which LO-ODU can be provided based on a determination of the remaining bandwidth. If the remaining bandwidth is not sufficient for some of the LO-ODU which would have been possible at the start, the according TP would also not be possible anymore and would be not defined by the definition unit during re-definition.

According to a further embodiment of the invention, the definition unit is adapted to consider the number of instances being possible for each determined optical channel data unit (LO-ODU).

The definition unit may also consider if only one instance is possible of an LO-ODU or if more than one instance of the same LO-ODU type can be used. If more than one instance of the same LO-ODU can be used and if the remaining bandwidth is sufficient, the definition unit would define the TP of this LO-ODU again. Otherwise, the TP of this ODUk-1 would not be defined again.

According to a further embodiment of the invention, if the selection scheme corresponds to a selection of more than one termination point, for instance the maximum instantiable termination points for each determined optical channel data unit and one possible termination point is selected by the user, the definition unit is adapted to re-define, for the selected optical channel data unit (ODUk), all remaining possible termination points by removing the selected possible termination point, although it can still be shown to the user since it should be already instantiated in the network.

According to this selection scheme, only the selected TP would be removed from the selectable TPs. All other TPs would be defined again by the definition unit.

According to a further embodiment of the invention, the definition unit is further adapted to remove possible termination points of optical channel data layers related to the selected possible termination point.

According to a further embodiment of the invention, the network management system further comprises a user interface, wherein the user interface is adapted to represent the number of the possible termination points to the user.

The user interface may be coupled to a display device for representing a list comprising the number of possible termination points. The user interface may also be coupled to an input device for receiving user inputs relating to the selection of a TP.

According to a further embodiment of the invention, the user interface is adapted to update the representation of the selected number of the possible termination points based on a re-definition by the definition unit.

Due to a selection of a TP by the user, the remaining TPs may be re-defined by the definition unit. The user interface may update the current representation of TPs based on the re-defined TPs.

According to a further embodiment of the invention, the user interface is adapted to highlight the selected possible termination point.

The selection of the TP by the user may be marked or highlighted. Also after re-definition of the TPs, the selected TP may be marked and presented to the user.

According to a further embodiment of the invention, the network management system further comprises a control unit being adapted to generate a physical termination point based on the selected possible termination point.

After a selection of a TP by a user, the control unit may generate a physical/real TP for the selected service related to the selected TP. As the presented, defined TPs are only virtual or potential TPs, the control unit may need to generate a real TP before the service can be transmitted.

According to a further embodiment of the invention, the control unit can make automatically the necessary calculations to define the necessary characteristics (i.e timeslot allocation and HO-ODU payload type) to generate the physical/real TP from the selected virtual or potential TP According to a second aspect of the invention, there is provided an optical transport network comprising a network management system as described above.

An optical transport network (OTN) as defined by ITU-T is a set of Optical Network Elements (ONE) connected by optical fiber links, able to provide functionality of transport, multiplexing, switching, management, supervision and survivability of optical channels carrying client signals.

A network management system as described above may be part of the OTN for defining termination points to be used in the network and providing an interface between the OTN and a user.

According to an embodiment of the invention, the optical transport network is a dense wavelength division multiplexing network. Such a network may include electrical switching on different ODU layers.

As already mentioned above, the described network management system is applicable to further networks technologies like Ethernet where it can be applicable.

As an example in a heterogeneous network management system the network management system can be extended to provide the automatic assignment of an Ethernet VLAN or MPLS Label by selecting a potential TP that represents the actual technology to be used (e.g. VLAN based/Label based) and allowing the control unit to automatically assign the necessary characteristics intrinsic to virtual TP selected.

According to a third aspect of the invention, there is provided a method for managing a transport network, wherein services are transmittable via the transport network by using at least one of a plurality of containers, wherein each of the containers is adapted to transmit data with a specific bandwidth, wherein each of the plurality of containers is multiplexable, according to a dynamic multiplexing structure, to at least another container being adapted to transmit data with a higher bandwidth. The method comprises selecting an container being adapted to transmit data with a first bandwidth out of the plurality of containers, determining all containers of the plurality of containers being adapted to transmit data with a bandwidth lower than the first bandwidth, defining all possible termination points (TP) for each determined container, wherein the definition unit is adapted to define all possible termination points before a service to be transmitted is selected by a user, and selecting a number of the possible termination points for each determined container based on a selection scheme in order to provide the selected number of the possible termination points to the user.

Generally herein, the system and embodiments of the system according to the first aspect or the network according to the second aspect may include units or devices for performing one or more functions described with regard to the third aspect or an embodiment thereof. Vice versa, the method and embodiments thereof according to the third aspect may include performing one or more functions described with regard to the first or second aspect or an embodiment thereof.

According to a fourth aspect of the herein disclosed subject-matter, a computer program for managing a transport network is provided, the computer program being adapted for, when executed by a data processor assembly, controlling the method as set forth in the third aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a network management system, an optical transport network and a method of managing a transport network. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless otherwise notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWING

It is noted that in different figures, similar or identical elements are provided with the same reference signs.

DETAILED DESCRIPTION

Figure 1:
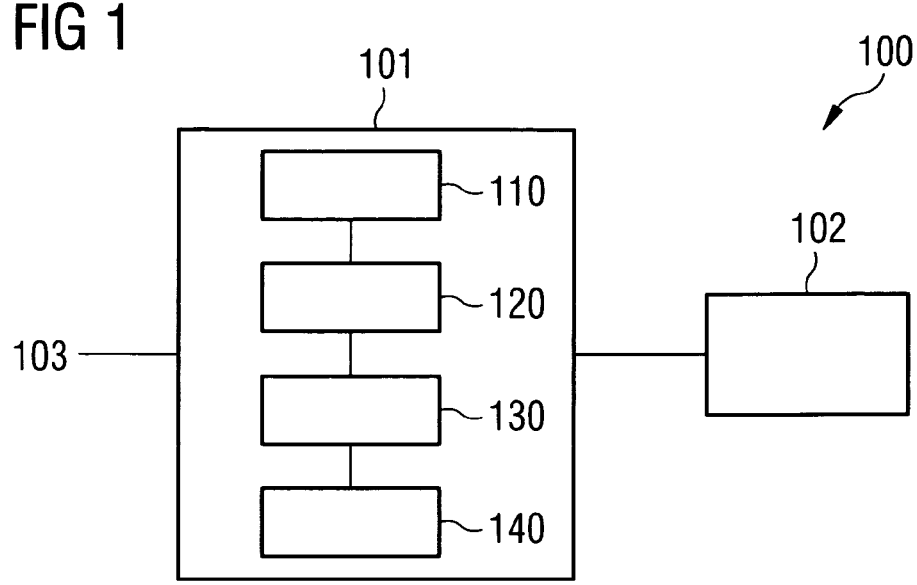
FIG. 1 shows a network management system according to an exemplary embodiment of the present invention.

In the following, embodiments of the herein disclosed subject matter are illustrated with reference to the drawings and reference to aspects of current standards, such as optical transport networks, and their further developments. However, such reference to current standards is only exemplary and should not be considered as limiting the scope of the claims. In particular, the network management system as illustrated in the drawings may be used in the context of other network technologies like Ethernet, VLAN or MPLS.

FIG. 1 shows a network management system 101, in particular usable for an optical transport network 100, according to an exemplary embodiment of the invention. The network management system 101 is adapted manage the optical transport network by managing optical channel data units (ODUk) which may used for transmitting data relating to a service selected by a user 102. The ODUk can be transmitted via links 103 of the optical transport network (OTN).

The network management system comprises a selection unit 110, a determination unit 120, a definition unit 130 and a sub-selection unit 140. The selection unit 110 selects an optical channel data unit (ODUk) being adapted to transmit data with a first bandwidth out of the plurality of optical channel data units. The determination unit 120 determines all optical channel data units (ODUk-1) of the plurality of optical channel data units being adapted to transmit data with a bandwidth lower than the first bandwidth.

The definition unit 130 defines all possible termination points (TP) for each determined optical channel data unit (ODUk-1). The definition unit defines all possible termination points before a service to be transmitted is selected by the user 102. Thus, the possible TPs are virtual and not yet existing TPs. The sub-selection unit 140 selects a number of the possible termination points for each determined optical channel data unit (ODUk-1) based on a selection scheme in order to provide the selected number of the possible termination points to the user 102.

Figure 2:
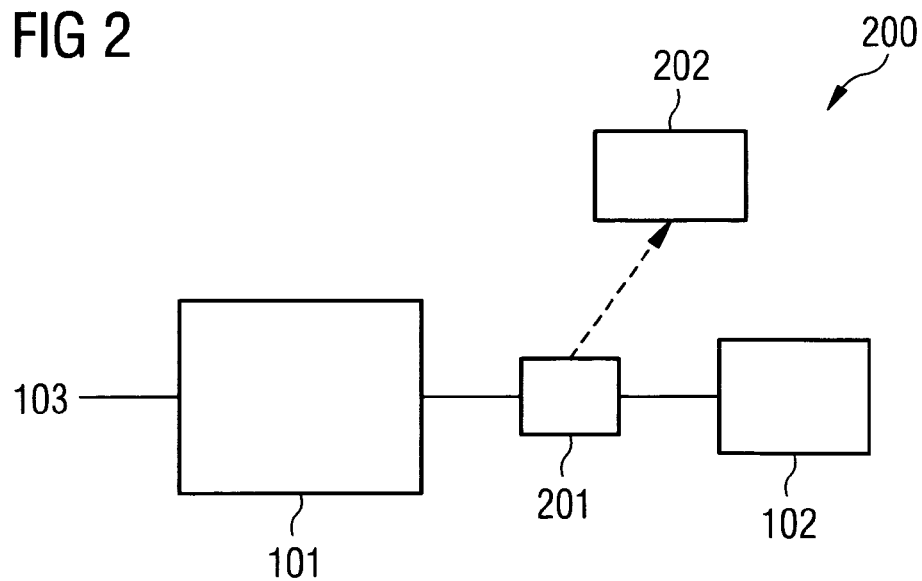
FIG. 2 shows a network management system according to a further embodiment of the present invention.

As shown in FIG. 2, the network management system 101 of the OTN 200 may comprise a user interface 201, here shown externally to the network management system. The user interface 201 may be coupled to a display device 202 for representing the number of possible TPs to the user via the display device. The user interface 201 may also receive input data from the user, for instance in view of a selected service or TP.

As already explained above, in order to represent structures not existing yet, the network management system may, either internally or via a northbound interface, define possible or Potential TP (in the following referred to as potential TP). Potential TPs may represent all possible combinations that can exist on a given container (ODUk).

It is desirable to be able to dynamically define the multiplex structure of an OTN and use the full flexibility of this technology. The flexible multiplex structures as well as the possibility to define the multiplex structure stepwise may be new requirements to the network management system. New generation DWDM structures cannot be directly managed as for already managed technologies (e.g. SDH).

Of course it may be possible that a user creates the required multiplex structures manually for each port. However this means high operational expenditure (OPEX) because each port required for a service has to be structured manually each time when a new service has to be configured in the network. In addition the auto-router cannot be used due to the missing structures and objects in the network management system.

According to the herein described network management system, potential TPs may be offered to the user. The potential TPs may represent the possible layer TPs which can be contained in an ODUk (define the ODU structure). However a single potential TP can be stored internally that represent all combinations that can be achieved to generate a TP of that given layer. As such, a potential TPs does not define the combination and the sequence of contained ODUs (combination and sequence are defined automatically when new services are configured). These potential TPs can still be used by the user for manual routing without any additional operation as well as by the auto-router.

For the presentation on the user interface, three approaches are possible. In the first approach or selection scheme, a single TP is shown per possible ODUk–n in an ODUk. The system offers the user one TP for each ODUk–n which can be contained in an ODUk. Only ODUk–n are offered, for which still enough bandwidths (i.e. time slots) are available. For instance, a possible presentation in the network element (NE) browser on the user interface may be:

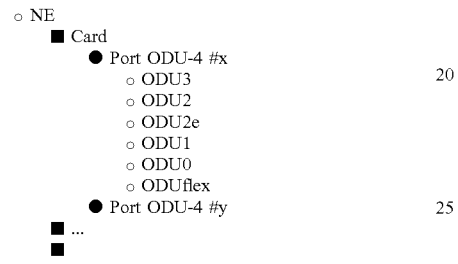

When the user wants to create a service and selects e.g. an ODU1 for a service, the ODUk–n TPs which can be contained after this TP is used, are recalculated automatically according the exclusive rules and the view to the user is updated. That is, the system calculates which ODU-k TPs can still be used within this ODU4 and presents the result to the user. As a result of the recalculation, it may happen that an ODUk-TP offered before is not selectable anymore because the remaining bandwidth is not sufficient any more. For example, when the user selects an ODU1-TP, it may happen that afterwards no ODU3-TP is offered because the remaining bandwidth (time slots) is not available any more (exclusive concept).

In case of ODUk-xV, the same TP can be used multiple times in order to route multiple fragments of the same service. This can be done both via manual or via automatic routing. The system may be therefore capable of understanding, taking in account the remaining bandwidth, how many instances of the same layer are still possible to create.

Optionally, it may be possible to consider in the available bandwidth non used termination points. If this solution is chosen, the system can delete non used termination points, in order to get bandwidth to instantiate a given termination point either with or without confirmation from the operator.

ODUk-TPs which are in use may be shown to the user in addition to be able to supervise the network. The exclusive concept considers the multiplicity and the amount of time slots which each ODUk layer requires (in dependence on the mapping mode and the HO-ODU layer).

In the second approach or selection scheme, all potential ODUk-1 TPs are shown which are theoretically possible. The network management system shows all potential TPs even that not all can be used for a service at the same time but only a subset in dependency on the combination of ODUks. An exclusive concept adapts the ODU-TP view always automatically to the set ODUk-TPs which can theoretically be used. This means, it will show all TPs that can be potentially used, but independent of concrete timeslot selection. The network management system may show also the ODUk TPs. It may be visible at the TP which ones are in use and which ones can be used. That means that in case one TP is used for a service, the according TPs of the related ODUk layer are automatically removed. According to embodiments of the invention, more than one possible/potential TP per LO-ODU is selected and presented to the user. One possible representation, wherein all possible TP are presented to the user, may be (of course, some of the shown TPs may be removed, when another selection scheme is chosen):

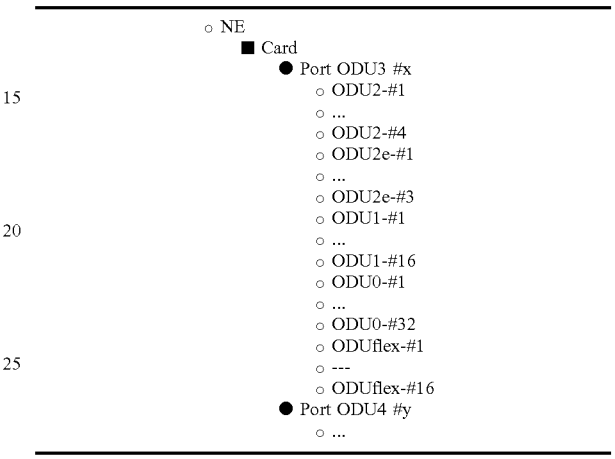

The number of ODUflex may be calculated from the minimum bandwidth supported by ODUflex. When the user selects e.g. an ODU1 for a service, the TPs which are available are recalculated automatically according the exclusive rules and the view to the user is updated. In the example below, the according ODU1 TP is marked as used and the according ODU2, ODU0 and ODUflex TPs are deleted from the list, because these potential TPs cannot be used any more for new services.

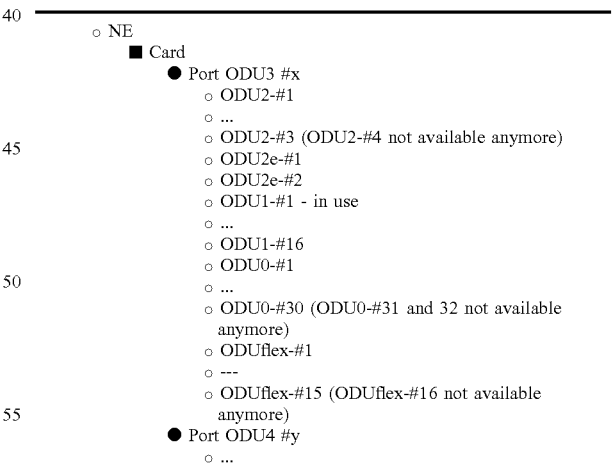

In a third approach or selection scheme, the structure shown is identical to a legacy structure. In the case were the port or HO-ODU is connected to a legacy NE, the structure bellow this port can already be shown in the static timeslot definition. This means that, for this case, the traditional approach of GUI representation of a potential TP can still be chosen. This solution is applicable at the same time as any of the above two ones, and complements the functionality, improving the usability.

For multi-stage multiplexing, the concepts are used recursively. The same concept can be enhanced for ports which support different client modes. That means that the user does not have to define the client port mode (e.g. STM64, 10 GBE LAN, 10 GBE WAN, OUT-2), but can immediately select the according potential TP. It can also, at the same time as it changes the Client Port mode allow the provisioning of concrete lower granularity resources. For instance, creation of an Ethernet flow based on VLAN or MPLS-TP, or also, a LO ODU-k service. In this scenario, all other TPs are deleted after any TP is selected. One exception exists for the client mode OTU-k, for which is it required to enable the selection of a contained ODUk-1.

With the system of potential TPs, the user can define the service and the complete route via the manual routing assistant as for technologies with less flexibility and fix multiplex structures (e.g. SDH). That means that the user can handle the network management system as accustomed. In addition the auto-router can be used without the need to implement the complex logic for ODU structures in the auto router, i.e. can use potential TPs as each other TP without the need to know that a TP is just potential. By the immediate re-calculation and update of the potential ODUk-TPs on the user interface, the user always has the actual view on the network.

For the potential ODUk-TP calculation, the network management system may consider (i) usage rules for the time slots, e.g. payload type (PT), mapping mode, OTU-k layer of the links which shall be used for a service, (ii) the exclusive rules for the different ODUk layer. In case one ODUk TP is selected, the network management system (NMS) automatically adjusts the potential ODUk TP list which is offered to the user.

The parameters which are required for the configuration (e.g. payload type, TS to use) can be manually defined by the user or automatically by the NMS. The time slots which are used for an ODUk are selected in any chosen algorithm, being the simpler a sequential selection taking in account existing gaps. For instance, if the time slots 5 and 17 are used in e.g. an ODU3 and an ODU2 has to be configured, the NMS automatically selects the time slots 1-4 and 6-9 for the ODU2.

All configurations (e.g. payload type (PT), time slots) which have to be identical at the ends of a link are automatically applied to both ends. That is, after the user defined PT, time slot usage, etc. once, the NMS may automatically use these definitions for the remote end-point of the Optical channel Transport Unit (OTU-k) link. The user needs not to care that parameters fit. Furthermore, the NMS may check if all configurations fit to the other end in case the user defined the required parameters for the both ends of a link manually, e.g. if time slots can be used at both ends of all links traversed for the route. Links in this context may be physical or logical HO-ODU links.

In addition, the NMS may consider if a configurable OTU-k port has to interwork with legacy equipment. In legacy equipment, the multiplex structures as well as the TS usage may be fixed and cannot be configured. For instance, in the case that a configurable OTU-k port is connected with legacy equipment, for which a fix multiplex structures and fix time slot assignments and rules have to be considered, the NMS may automatically adopt the ODU structure (inclusive TS used) to the configurable port at the other end of a link and does not allow the user to modify the fix parameter settings.

When the user decides to create a new service in the network, the NMS may automatically create the required multiplex structure in all NEs which participate in the service according the selected ODUk-TP simultaneously. However the time slots used can differ in dependence on the usage, OTU-k layer and the mapping mode used.

Both selection schemes, i.e. "single TP is shown per possible ODUk-1 in an ODUk" and "All potential ODUk-1 TPs are shown which are theoretically possible" are of same quality. The single TP per layer scheme offers the advantage of short lists for the selection of the required TP. With the all potential TP scheme, the user has to handle longer TP lists however gets an overview about the free capacity and the potential services which can be switched via a port. However, it has the main advantage of allowing the operator to select the ODUk ID if for some reason this is needed by the operator.

The described system may provide the following advantages:

Simple and accustomed use of the network management system—OPEX.

User does not have to know and care about ODU multiplicity, time slot usage or payload type dependencies—OPEX.

User can define service without the need to define the multiplex structure manually in advance for each port which shall be used for a service—OPEX.

Auto-router can be used without any special knowledge of the ODU-structures—CAPEX.

Multiplex structure is created automatically in the context of the service—OPEX.

Concept can be used for a multi-client system.

The potential TP method/system can also be used for the auto-routing in the network elements control plane as well as for the connectivity management of all label based technologies, e.g. MPLS-TP, VLAN. For label based technologies the number of timeslot combinations is not the problem, but the number of possible TPs (e.g. 4096 for VLAN labels, about 16 million for MPLS-TP). In this case, although both solutions are possible, with improved graphical interface (like via a multi state hierarchical representation), a single VLAN or MPLS-TP can be shown that when instantiated will be converted to a real VLAN or MPLS-TP termination point. Again here, operator will be able to use the automatic selection of a VLAN ID or label or manually define the VLAN directly on the displayed object in the tree.

Similar to the presentation of the potential ODU TPs, additional information can be shown per presented TP as well. However the advantages for the label solution are the same as for ODU switched networks, e.g. auto-router, performance of the NMS and of course usability.

Figure 3A:
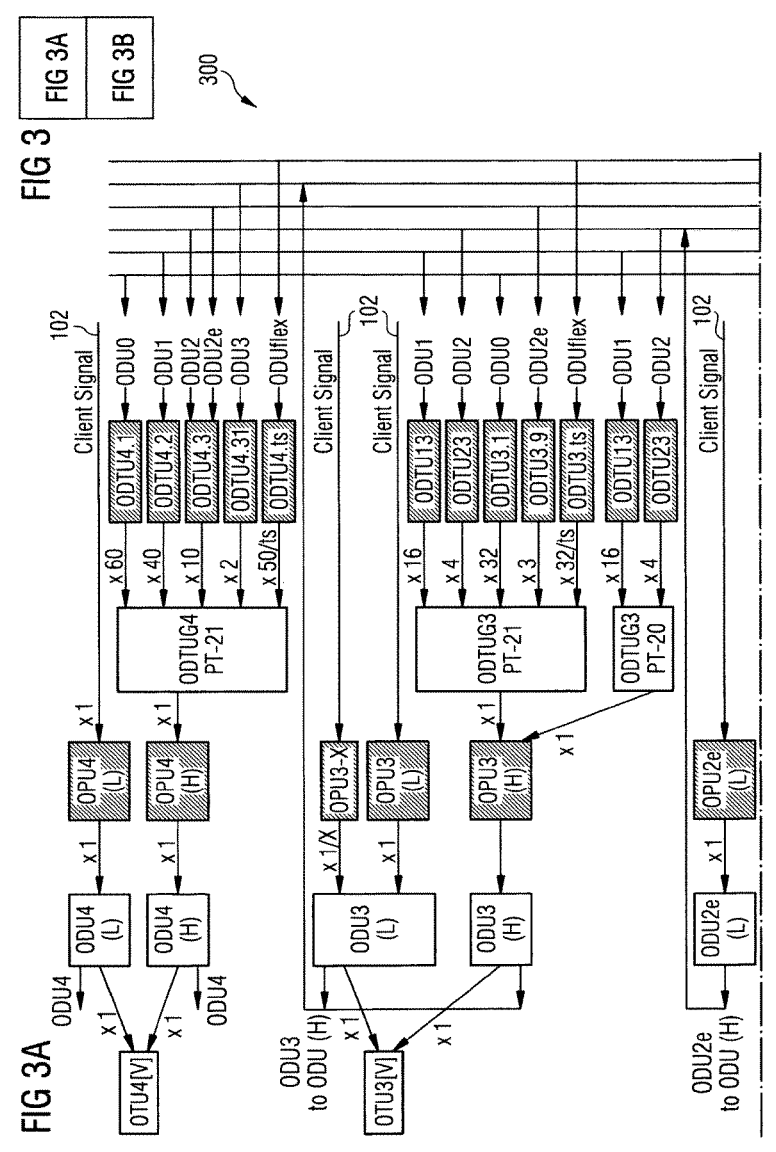
Figure 3B:
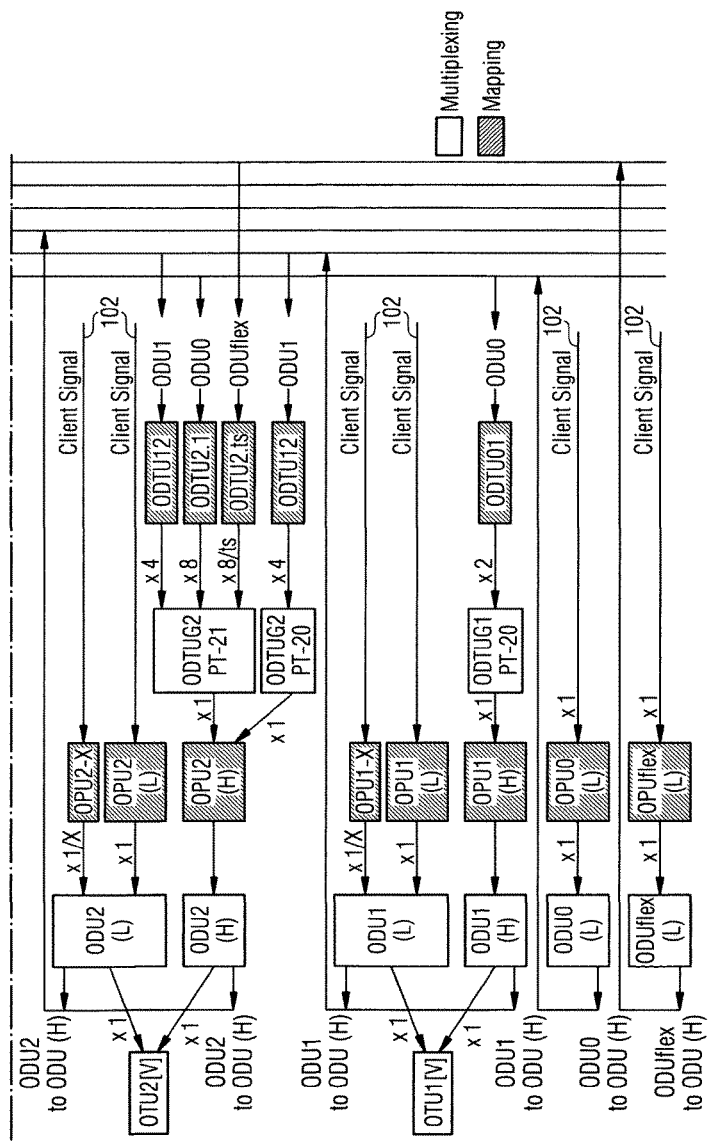
FIG. 3 shows an example for the ODUk multiplex structure of an optical transport network.

FIG. 3 shows the multiplex structure of an optical transport network 300 according to ODU multiplexing structures as defined in ITU G.709.

As already discussed, in new generation DWDM networks several transport container (transmission layer) exist, i.e. ODUk with k=0 to 4, which can be multiplexed to each other without the need to follow fix containments and multiplex structures. That is, each ODUk (k=1-4 today) can be multiplexed into each ODUk+n in any arbitrary order.

An ODUk can contain all ODUk-n (LO-ODU). The LO-ODU can be of the same layer only or mixed in each possible combination. However the overall bandwidth can be used only once, i.e. the load of one ODU3 is adequate to e.g. 4×ODU2 or 16×ODU1 or 32×ODU0. In addition ODU2/3e and ODUflex has to be considered. (note: for ODUflex the bandwidth can be modified (increased/decreased) from 2.5 G to 100 G and multiplexed to each HO-ODUk (k=2–4)). That is, no fix multiplicity and relationship to the other ODUk layer can be defined.

The containment could be ODU1, ODU0, ODU0, ODU3, ODU2, ODUflex, . . . in each possible sequence of all possible ODUks. In addition the multiplexing cannot only be single stage but multistage, i.e. an ODU0 can be multiplexed into an ODU1, the ODU1 again into an ODU2, the ODU2 again into an ODU3 and the ODU3 again into an ODU4. Only ODUflex can be multiplexed to the HO-ODU only, i.e. single stage multiplexing is defined according standards only.

As shown in FIG. 3 a signal from a client 102 can be mapped into an OPU (optical channel payload unit). This OPU may be multiplexed into an ODU (optical channel data unit). ODUs may be multiplexed directly into an OTU (optical channel transport unit) or may be multiplexed to each other (lower bandwidth ODU to higher bandwidth ODU). In FIG. 3, blocks with hatch indicate mapping and blocks without hatch indicate multiplexing.

Having regard to the subject matter disclosed herein, it should be mentioned that, although some embodiments refer to specific standards or specific communication techniques, these embodiments are considered to implicitly disclose the respective general term with the desired functionality.

According to embodiments of the invention, any suitable entity (e.g. components, units and devices) disclosed herein, e.g. selection unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularities on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Optical transport network
101 Network management system
102 User
103 Connection to remaining network
110 Selection unit
120 Determination unit
130 Definition unit
140 Sub-selection unit
200 Optical transport network
201 User interface
202 Display device
300 Optical transport network

The invention claimed is:

1. A network management system for a transport network, wherein services are transmittable via the transport network by using at least one of a plurality of containers, wherein each of the plurality of containers is adapted to transmit data with a specific bandwidth, wherein each of the plurality of containers is multiplexable, according to a dynamic multiplexing structure, to at least another container being adapted to transmit data with a higher bandwidth, wherein the transport network is an optical transport network, and wherein the plurality of containers is a plurality of optical channel data units, the network management system comprising
a selection unit being adapted to select a container being adapted to transmit data with a first bandwidth out of the plurality of containers,
a determination unit being adapted to determine all containers of the plurality of containers being adapted to transmit data with a bandwidth lower than the first bandwidth,
a definition unit being adapted to define all possible termination points for each determined container, wherein the definition unit is adapted to define all possible termination points before a service to be transmitted is selected by a user, and
a sub-selection unit being adapted to select a number of the possible termination points for each determined container based on a selection scheme in order to provide the selected number of the possible termination points to the user,
wherein, if the selection scheme corresponds to a selection of one possible termination point for each determined optical channel data unit and one possible termination point is selected by the user, the definition unit is adapted to re-define, for the selected optical channel data unit, all remaining possible termination points being available based on a determination of the remaining bandwidth, or
wherein, if the selection scheme corresponds to a selection of more than one possible termination point for each determined optical channel data unit and one possible termination point is selected by the user, the definition unit is adapted to re-define, for the selected optical channel data unit, all remaining possible termination points by removing the selected possible termination point.

2. The network management system as set forth in claim 1, wherein the selection unit, the determination unit, the definition unit and the sub-selection unit are adapted to repeat their functionalities for each of the plurality of optical channel data units.

3. The network management system as set forth in claim 1, wherein the selection scheme corresponds to a selection of more than one possible termination point for each determined optical channel data unit or to a selection of one possible termination point for each determined optical channel data unit.

4. The network management system as set forth in claim 3, wherein the definition unit is adapted to redefine, for the selected optical channel data unit, the possible termination points for each determined optical channel data unit, after a service and/or corresponding termination point is selected by the user.

5. The network management system as set forth in claim 1, wherein, if the selection scheme corresponds to a selection of one possible termination point for each determined optical channel data unit and one possible termination point is selected by the user, the definition unit is adapted to consider the number of instances being possible for each determined optical channel data unit.

6. The network management system as set forth in claim 1, wherein, if the selection scheme corresponds to a selection of more than one possible termination point for each determined optical channel data unit and one possible termination point is selected by the user, the definition unit is further adapted to remove possible termination points of optical channel data layers related to the selected possible termination point.

7. The network management system as set forth in claim 1, further comprising a user interface, wherein the user interface is adapted to represent the selected number of the possible termination points to the user.

8. The network management system as set forth in claim 7, wherein the user interface is adapted to update the representation of the selected number of the possible termination points based on a re-definition by the definition unit.

9. The network management system as set forth in claim 7, wherein the user interface is adapted to highlight the selected possible termination point.

10. The network management system as set forth in claim 1, further comprising a control unit being adapted to generate a physical termination point based on the selected possible termination point.

11. An optical transport network comprising a network management system as set forth in claim 1.

12. A method for managing a transport network,
wherein services are transmittable via the transport network by using at least one of a plurality of containers, wherein each of the plurality of containers is adapted to transmit data with a specific bandwidth, wherein each of the plurality of containers is multiplexable, according to a dynamic multiplexing structure, to at least another container being adapted to transmit data with a higher bandwidth, wherein the transport network is an optical transport network, and wherein the plurality of containers is a plurality of optical channel data units,
the method comprising
selecting a container being adapted to transmit data with a first bandwidth out of the plurality of containers,
determining all containers of the plurality of containers being adapted to transmit data with a bandwidth lower than the first bandwidth,
defining all possible termination points for each determined container, wherein all possible termination points are defined before a service to be transmitted is selected by a user, and
selecting a number of the possible termination points for each determined container based on a selection scheme in order to provide the selected number of the possible termination points to the user
wherein, if the selection scheme corresponds to a selection of one possible termination point for each determined optical channel data unit and one possible termination point is selected by the user, the definition unit is adapted to re-define, for the selected optical channel data unit all remaining possible termination points being available based on a determination of the remaining bandwidth, or
wherein, if the selection scheme corresponds to a selection of more than one possible termination point for each determined optical channel data unit and one possible termination point is selected by the user, the definition unit is adapted to re-define, for the selected optical channel data unit, all remaining possible termination points by removing the selected possible termination point.

* * * * *